United States Patent [19]
Pöllmann et al.

[11] Patent Number: 5,411,668
[45] Date of Patent: May 2, 1995

[54] PROCESS FOR THE RECLAMATION OF USED GLYCOLIC AIRCRAFT DEICING COMPOSITIONS

[76] Inventors: Klaus Pöllmann, Dr.-Enk-Strasse 7, D-84489 Burghausen; Jörg Von Eysmondt, Kibitzweg 23, D-65719 Hofheim am Taunus, both of Germany

[21] Appl. No.: 285,791

[22] Filed: Aug. 4, 1994

[30] Foreign Application Priority Data

Aug. 5, 1993 [DE] Germany .................. 43 26 345.3

[51] Int. Cl.6 ............................................. B01D 61/16
[52] U.S. Cl. ..................................... 210/638; 210/651; 210/259
[58] Field of Search ........... 210/638, 259, 651, 500.41, 210/500.38

[56] References Cited

U.S. PATENT DOCUMENTS

| | | |
|---|---|---|
| 4,358,389 | 11/1982 | König-Lumer et al. |
| 4,744,913 | 5/1988 | Salvador et al. |
| 5,034,134 | 7/1991 | George et al. ................. 210/651 |

*Primary Examiner*—Frank Spear

[57] ABSTRACT

In the described process, the used aircraft deicing fluid is subjected first to a conventional filtration to remove undissolved substances and subsequently to an ultrafiltration to remove, in particular, the polymeric thickeners. The permeate from the ultrafiltration is then treated with ion exchangers, and the resulting eluate, essentially composed of glycol and water, is subsequently distilled to remove water and thus the glycol content is brought to the required value. The glycol/water solution obtained in this way can be used to prepare a new aircraft deicing composition by mixing the other components required in the glycol/water solution.

10 Claims, No Drawings

PROCESS FOR THE RECLAMATION OF USED GLYCOLIC AIRCRAFT DEICING COMPOSITIONS

DESCRIPTION

The invention relates to a process for the reclamation of used aircraft deicing compositions based on glycols.

Deicing compositions of this type are described, for example, in U.S. Pat. Nos. 4,358,389 and 4,744,913. They are essentially composed of (a) about 40 to 80% by weight of at least one glycol compound, for example ethylene glycol, diethylene glycol, propylene glycol and the like, (b) 0.05 to 1.5% by weight of at least one polymeric component as thickener, for example from the group of polyacrylates, polyethacrylates, xanthan gum and cellulose derivatives, (c) 0.05 to 1% by weight of at least one surfactant, for example olefinsulfonates, alkylarylsulfonates, polyalkoxylates and the like, (d) at least one corrosion inhibitor in an effective amount, for example from the group of triazoles, imidazoles and/or phosphoric esters, and (e) at least one basic compound to adjust the pH to about 7.5 to 11 and (f) water as remainder to 100% by weight.

These aircraft deicing compositions are applied as such (that is to say as concentrate) or after dilution with water to the aircraft components to be treated to preserve them and/or remove ice and/or snow. From the treated aircraft components the deicing composition, which is now more or less diluted with water from the melting and is contaminated with sand, abraded rubber, oil, combustion residues and the like, flows into a collecting tank and is called wastewater from aircraft deicing or used aircraft deicing composition.

At present used aircraft deicing compositions are disposed of by means of a biological treatment plant. However, this leads—despite the good biodegradability of the glycols—to unwanted strain on the treatment plant, especially when the outside temperatures are low and, connected with this, the bacterial activity is reduced, which is generally the case when deicing compositions are used. Another disadvantage of this type of disposal of aircraft deicing compositions is the loss of the glycol which is present in large quantity and is valuable.

The object of the invention is accordingly to propose a simple and low-cost process which makes it possible substantially to recover and reuse in particular the glycol compounds from used aircraft deicing compositions.

The process according to the invention for the reclamation of used aircraft deicing compositions based on glycols comprises (1) initially filtering the used aircraft deicing composition to remove, in particular, the suspended contaminants, (2) subjecting the filtrate obtained in step (1) to an ultrafiltration to remove, in particular, the polymer thickeners, (3) treating the ultrafiltration permeate obtained in step (2) with an anion exchanger and a cation exchanger to remove, in particular, salts and ionic compounds which are present and (4) distilling the solution obtained in step (3) to remove excess water and thus adjust the glycol content to the required value.

Thus, according to the invention, in a first step the insoluble components which are present are removed by filtration, for example solids such as sand and abraded rubber as well as suspended matter, oil particles and the like. This coarse filtration, which is preferably carried out at room temperature and under atmospheric pressure, can be carried out with conventional filter materials, for example paper, cloth, fabric and the like.

The filtrate obtained from the coarse filtration is then subjected to an ultrafiltration, that is to say passed through a membrane so that, in particular, the polymer thickener is removed. Besides this there is also removal to a greater or lesser extent of, for example, emulsified oil which is present, and higher hydrocarbons, surfactants and the like. The ultrafiltration step is preferably carried out in such a way that (2.1) an ultrafiltration membrane with a nominal separation limit (cut off) of 1000 to 500,000 is employed, preferably with a cut off of 100,000 to 300,000, (2.2) the ultrafiltration membrane is composed of an organic polymer or an inorganic material, with preferred membranes being composed of polysulfones, polyether-sulfones or polyaramides, (2.3) tubular modules, capillary modules, plate modules and, preferably, spiral coil modules are employed as membrane modules, (2.4) a pressure across the membrane of 2 to 10 bar, preferably 3 to 6 bar, is used and (2.5) the process is carried out at a temperature of 20° to 80° C., preferably 40° to 60° C., in order to reduce the concentrate viscosity which increases on accumulation of the polymer thickener during the ultrafiltration.

The product (permeate or solution) of the ultrafiltration is, according to the invention, subjected to an ion exchange process in which it is treated with a combination of anion exchanger and cation exchanger. A preferred way of treating or contacting the permeate with the ion exchangers is one in which these are present in the form of a bed (also called column), and the liquid is passed through the exchange bed and the purified permeate is collected at the end of the bed. It is clear that in the case of a combination of anion exchanger and cation exchanger the outflow (eluate) from the first is then passed through the second ion exchanger and the purified liquid (eluate) is collected at the end of this bed. It has proven advantageous to contact the permeate first with a preferably strongly acidic cation exchanger and subsequently with a preferably strongly basic anion exchanger. The treatment of the permeate with the ion exchangers is generally carried out at room temperature. Higher temperatures may also be advantageous. Thus, the treatment temperature is generally from 15° to 70° C., preferably 20° to 50° C. This treatment is furthermore carried out, depending on the required rate of flow through the ion exchanger bed, under atmospheric pressure, with an elevated pressure or with a more or less reduced pressure. With regard to the amount of ion exchanger per liter of liquid to be treated, the rate of flow through the exchanger bed and the like, these data can be taken from the specification for the ion exchanger used or established in simple preliminary tests. The specification sheet for the ion exchanger used furthermore indicates, besides the capacity, bed height, loading rate and the like, also, for example, the structure of the ion exchanger (gel-form or porous), the bulk density, the particle size, the pH (strongly acidic, weakly acidic, strongly basic, weakly basic) and the like. In the process according to the invention it is possible to use ion exchange resins with gel-form or more or less porous structure, and those with gel-form or macroporous structure are preferred. The structure of the ion exchanger in terms of the basic skeleton and anchor group is not critical for the process according to the invention. It is merely necessary that the anchor group provides the stated acidic or basic character. Numerous anion and cation exchangers with specification sheet which are suitable for this purpose are commercially obtainable. Examples of basic skeletons are polystyrene, polyacrylate, copolymers of styrene and acrylate, styrene and divinylbenzene and the like. Examples of strongly acidic and weakly acidic anchor groups are sulfonic acid and phosphonic acid (which are strongly acidic groups) and carboxylic acid (weakly acidic). Examples of strongly basic and weakly basic anchor groups are primary, secondary and tertiary amine (which are weakly basic groups) and quaternary amine (strongly basic).

The liquid which is obtained after the ion exchanger treatment and is clear and colorless (water-white) or pale yellow in color is essentially composed of the stated glycols and water. This glycol/water solution which is enriched with water is subjected to a distillation in order to reduce its water content, that is to say to remove sufficient water by distillation to obtain a glycol/water solution such as is employed to produce a new aircraft deicing composition. The distillation, in which the intention is therefore to remove only the water and not glycol too, is carried out under atmospheric pressure or, where appropriate, slightly reduced pressure. The bottom temperature will preferably be about 100° to 120° C. The resulting bottom liquid represents a glycol/water solution with which a new aircraft deicing composition can be prepared by mixing the other components necessary into the glycol/water solution.

The process according to the invention is particularly suitable for used aircraft deicing compositions essentially composed of (a) 1 to 60% by weight, preferably 5 to 50% by weight, of the said glycols, (b) up to 0.8% by weight, preferably 0.05 to 0.5% by weight, of the said water-soluble polymers from the group of polyacrylates and polymethacrylates, (c) about 0.01 to 1% by weight of the said surfactants, preferably from the group of anionic surfactants, for example sulfonates such as olefinsulfonates and alkylbenzenesulfonates, (d) about 0.001 to 0.1% by weight of corrosion inhibitor, preferably from the group of triazoles, and (e) basic compounds from the group of alkali metal hydroxides and amine compounds to adjust to an alkaline pH, and water as remainder to 100% by weight.

The multistage processing, according to the invention, of polymer-thickened glycolic aircraft deicing compositions achieves a more than 90% by weight recovery of the glycol content in the collected used deicing composition mixture, and it is possible to produce the original aircraft deicing composition ready for use again from the resulting glycol/water solution after the addition of the components removed in the decontamination process.

The invention is now explained in more detail by one example and two comparative examples.

EXAMPLE

A used aircraft deicing fluid composed of the following essential components is employed:

12.00% by weight of diethylene glycol
4.00% by weight of propylene glycol
0.04% by weight of alkali metal polyacrylate as thickener
0.05% by weight of sodium alkylbenzenesulfonate as anionic surfactant
0.01% by weight of benzotriazole as corrosion inhibitor
83.90% by weight of water as remainder to 100% by weight (percentages by weight based on the liquid).

This used aircraft deicing composition, which had a pH of 8.5, was first filtered through a filter paper with a pore diameter of about 50 μm. The filtrate was subjected to an ultrafiltration with the following conditions:

Membrane: Polyaramide membrane with an area of 6 m= and a cut off of 20,000
Module: Spiral coil module
Temperature: 30° C.
Pressure: 3 bar.
Ultrafiltration result:
Amount of permeate: 93.5% by weight based on the amount of liquid employed.
The permeate contained:
12.00% by weight of diethylene glycol
4.00% by weight of propylene glycol less than 0.01% by weight of alkali metal polyacrylate
0.03% by weight of sodium alkylbenzenesulfonate
0.01% by weight of benzotriazole
Water as remainder to 100% by weight (percentages by weight based on the amount of permeate).
Amount of concentrate (discarded): 6.5% by weight based on the amount of liquid employed.
The concentrate contained:
12.00% by weight of diethylene glycol 4.00% by weight of propylene glycol
0.51% by weight of alkali metal polyacrylate
0.28% by weight of sodium alkylbenzenesulfonate
0.01% by weight of benzotriazole
Water as remainder to 100% by weight (percentages by weight based on the amount of concentrate).

The permeate obtained from the ultrafiltration was passed first over a strongly acidic cation exchanger (polystyrene with sulfonic acid groups) and subsequently over a strongly basic anion exchanger (polystyrene with quaternary ammonium groups).

The eluate contained:
12.00% by weight of diethylene glycol
4.00% by weight of propylene glycol
less than 0.01% by weight of alkali metal polyacrylate
less than 0.005% by weight of sodium alkylbenzenesulfonate
less than 0.005% by weight of benzotriazole
Water as remainder to 100% by weight (percentages by weight based on the eluate).

In a last step, the glycol content of the eluate was adjusted to 55% by weight by removal of water by distillation. The glycol recovery rate was 91% by weight based on the amount of glycol in the used aircraft deicing fluid.

The glycol/water solution obtained in this way can be reused, for example after addition of surfactant, as dilute type I deicing composition and, after further addition of thickener, as type II deicing composition.

The terms type I and type II arise as follows: the Association of European Airlines (AEA) Recommendations for Deicing/Antiicing of Aircraft on the Ground (March 1993 edition) distinguishes two types of aircraft deicing compositions.

Type I deicing compositions contain besides glycol as principal amount, water, surfactants and corrosion inhibitors and are generally employed in a dilution with water in the ratio 50:50. Type II deicing compositions contain besides glycol and water surfactants, corrosion inhibitors and water-soluble polymers as thickeners which confer a highly viscous pseudoplastic consistency on this type of deicing composition. Accordingly, aircraft deicing results in used fluids in the form of type I or type II deicing compositions or in the form of a mixture of the two. The process according to the invention can be used to reclaim all three variants of used aircraft deicing compositions.

Comparative Example 1

The used aircraft deicing fluid from Example 1 was, after filtration through the said filter paper but without previous ultrafiltration, passed over the two ion exchangers mentioned. The polymer molecule present in solution immediately blocked and gummed up the ion exchanger columns so that no further processing was possible.

Comparative Example 2

An attempt was made to adjust the used aircraft deicing fluid of Example 1 after filtration through the said filter paper but without previous ultrafiltration and ion exchanger treatment simply by distillation to the acquired glycol content of 50 to 80% by weight. Complete distillation was impossible because of the presence of the surfactant which caused serious foaming and because of the accumulation of the thickener, which led to an increase in viscosity.

We claim:

1. A process for the reclamation of used aircraft deicing compositions containing at least one glycol at least one polymer thickener, at least one salt or ionic compound, and water, which comprises
    (1) initially filtering the used aircraft deicing composition to substantially remove essentially suspended contaminants,
    (2) subjecting the filtrate obtained in step (1) to an ultrafiltration to substantially remove at least the polymer thickener or thickeners,
    (3) treating the ultrafiltration permeate obtained in step (2) with an anion exchanger and a cation exchanger to substantially remove salt or salts or ionic compound or compounds which are present and
    (4) distilling the solution obtained in step (3) to remove water and thus adjust the glycol content to a predetermined desired value.

2. A process as claimed in claim 1, wherein the ultrafiltration is carried out: (2.1) with an ultrafiltration membrane having a nominal separation limit of 1000 to 500,000, (2.2) said ultrafiltration membrane being comprised of an organic polymer or an inorganic material, (2.3) with tubular modules, capillary modules, plate modules or spiral coil modules employed as ultrafiltration membrane modules, (2.4) with a pressure across the ultrafiltration membrane of 2 to 10; (2.5) the process being carried out at a temperature of 20° to 80° C.

3. A process as claimed in claim 1, wherein the ultrafiltration is carried out: (2.1) with an ultrafiltration membrane having a nominal separation limit of 100,000 to 300,000, (2.2) said ultrafiltration membrane being comprised of an organic polymer or an inorganic material, (2.3) with tubular modules, capillary modules, plate modules or spiral coil modules employed as ultrafiltration membrane modules, (2.4) with a pressure across the ultrafiltration membrane of 3 to 6 bar; (2.5) the process being carried out at a temperature of 40° to 60° C.

4. The process as claimed in claim 2, wherein the ultrafiltration membrane is composed of an organic polymer from the group of polysulfones, polyethersulfones and polyaramides.

5. The process as claimed in claim 3, wherein the ultrafiltration membrane is composed of an organic polymer from the group of polysulfones, polyethersulfones and polyaramides.

6. The process as claimed in claim 2, wherein spiral coil modules are employed as membrane modules.

7. The process as claimed in claim 3, wherein spiral coil modules are employed as membrane modules.

8. The process as claimed in claim 1, wherein the ultrafiltration permeate is contacted first with a cation exchanger and the outflow therefrom is contacted with an anion exchanger.

9. The process as claimed in claim 1, wherein the ultrafiltration permeate is contacted first with a strongly acidic cation exchanger and the outflow therefrom is contacted with a strongly basic anion exchanger.

10. The process as claimed in claim 1, wherein the solution obtained after the ion exchanger treatment, consisting essentially of glycol and water, is distilled to remove the water and, during this, the glycol content of the solution is adjusted to 40 to 80% by weight, percentages by weight based on the solution.

* * * * *